May 6, 1947. A. S. MILLER ET AL 2,420,186
AIRPLANE HANGAR, ADMINISTRATIVE, AND SHOP UNIT
Filed Dec. 27, 1943 4 Sheets-Sheet 1

Inventors:
Arthur S. Miller,
Carl W. Frank,
Reynold R. Hagglund,
By: Howard L. Fischer
Attorney May 6, 1947.  A. S. MILLER ET AL  2,420,186
AIRPLANE HANGAR, ADMINISTRATIVE, AND SHOP UNIT
Filed Dec. 27, 1943  4 Sheets-Sheet 2

Inventors:
Arthur S. Miller,
Carl W. Frank,
Reynold R. Hagglund,
By: Howard P. Fischer
Attorney May 6, 1947.   A. S. MILLER ET AL   2,420,186
AIRPLANE HANGAR, ADMINISTRATIVE, AND SHOP UNIT
Filed Dec. 27, 1943   4 Sheets-Sheet 3

May 6, 1947.　　　A. S. MILLER ET AL　　　2,420,186
AIRPLANE HANGAR, ADMINISTRATIVE, AND SHOP UNIT
Filed Dec. 27, 1943　　　4 Sheets-Sheet 4

Inventors:
Arthur S. Miller,
Carl M. Frank,
Reynold R. Hagglund,
By
Attorney

Patented May 6, 1947

2,420,186

UNITED STATES PATENT OFFICE 2,420,186

AIRPLANE HANGAR, ADMINISTRATIVE, AND SHOP UNIT

Arthur S. Miller, Carl W. Frank, and Reynold R. Hagglund, Minneapolis, Minn.

Application December 27, 1943, Serial No. 515,828

1 Claim. (Cl. 189—1.5)

This invention relates to airplane hangar, administrative and shop units, the hangar of which is designed to receive the engine and wing section of the airplane within a triangular-like enclosure to provide the hangar unit of the buildings. The administration building unit and the shop building unit are virtually of a rectangular shape and connect with the hangar unit of the buildings.

It is a feature to provide an airplane hangar which is adapted to receive airplanes of modern design and particularly to enclose the engine and wing sections of the airplane so that these portions of the airplane are easily accessible within the hangar and are enclosed and protected from the outside weather to permit the respective airplanes to be serviced in a hangar taking the smallest amount of space that is possible for the size of the respective airplanes.

The respective building units may be laid out in a simple manner by indicating three lines at 60° to one another and selecting a common point at the intersection of these lines as an axis for the general location of the hangar units and the administrative and shop units.

The size of the hangar unit will depend upon the largest airplane to be serviced in a particular location. The overall width should be such as to provide clearance for the wing tips. The overall height is such as to provide clearance for the propellers, wings and fuselage, and one hangar of a group may provide enough height for the empennage section in the event it is desirable to place the tail of the airplane into the hangar. In one form of our hangar unit, the same may be extended from the triangular main body portion to include a hangar building formation to include the whole airplane.

It is a feature to provide the shop unit with a width and length as may be desired and we have found that the width may be approximately 24 feet while the length may be approximately 36 feet so as to accommodate the servicing of the respective airplanes. The ceiling height of the shop unit should be approximately three feet greater than the diameter of the propellers. It will be apparent that office and storage space may be provided on the second floor of the shop unit, or the administrative building may be in a unit spaced from the cluster of airplane hangar units and connected by an enclosed passageway as will be hereinafter more fully set forth.

With our design of airplane hangar units, it will be apparent that one hangar unit or two or three units may be connected together. Where two or three units are used, they are connected together with a common axis with the shop or administrative building spacing the hangar units apart and yet connecting the same through these buildings, which, when viewed from above, form virtually a Y-shape.

The advantage in our unit construction of airplane hangars and other respective buildings resides in permitting an airfield to start out with a single unit and add the other units as they may be required. Further, the arrangement and design of our building units not only take up less ground space, but also may be built and maintained economically.

A feature also resides in providing building units wherein each airplane can be moved in or out of the respective hangar unit independently without interfering with any other airplane or hangar. Further, we provide building units which require a low heating cost, it only being necessary to partially house the airplane if it is desired. A further advantage resides in the fact that when the doors are opened, only one unit is exposed to the outer atmosphere at a time, thus reducing the fire hazard. The shop area is handy for servicing.

It is an important feature of our airplane hangar and building units that they can be used for servicing, loading and unloading passengers, as well as cargo, under cover of the building units and the second floor of the shop can be used as a corridor to the various hangars or to a spaced administrative building. It will be apparent that the triangular shaped hangar unit provides minimum space necessary to house maximum size airplanes.

The combination of the rectangular shaped shop or administrative building with three triangular hangar units will complete a circle about a point requiring minimum space for construction and independent movement of the airplanes in and out of the respective hanger units. The combination of three groups of three hangars and three shops will require minimum space in a building area at an airport which eliminates aprons and yet contains independent movement of the aircraft from and to the respective hangar units.

In cases where the airport is of such a nature that it would be desirable to arrange the hangar units in line, then the rectangular shop or administrative units can be zigzagged with the hangar units fitting into the trianguglar spaces on either side of the zigzag shop or administrative building units.

Furthermore, where it is desirable to cluster the hangar units in groups of three hangar units and rectanguglar building units spacing the hangar units apart are desired for use in shops and passageways, then the administrative or airport buildings may be placed in a convenient location away from the shop and hangar units. However, it is desirable to connect all of the units by enclosed passageways which permits the passengers and attendants to travel from the main administrative building to any one of the group of hangars.

In the drawings forming a part of the specification:

Figure 1:
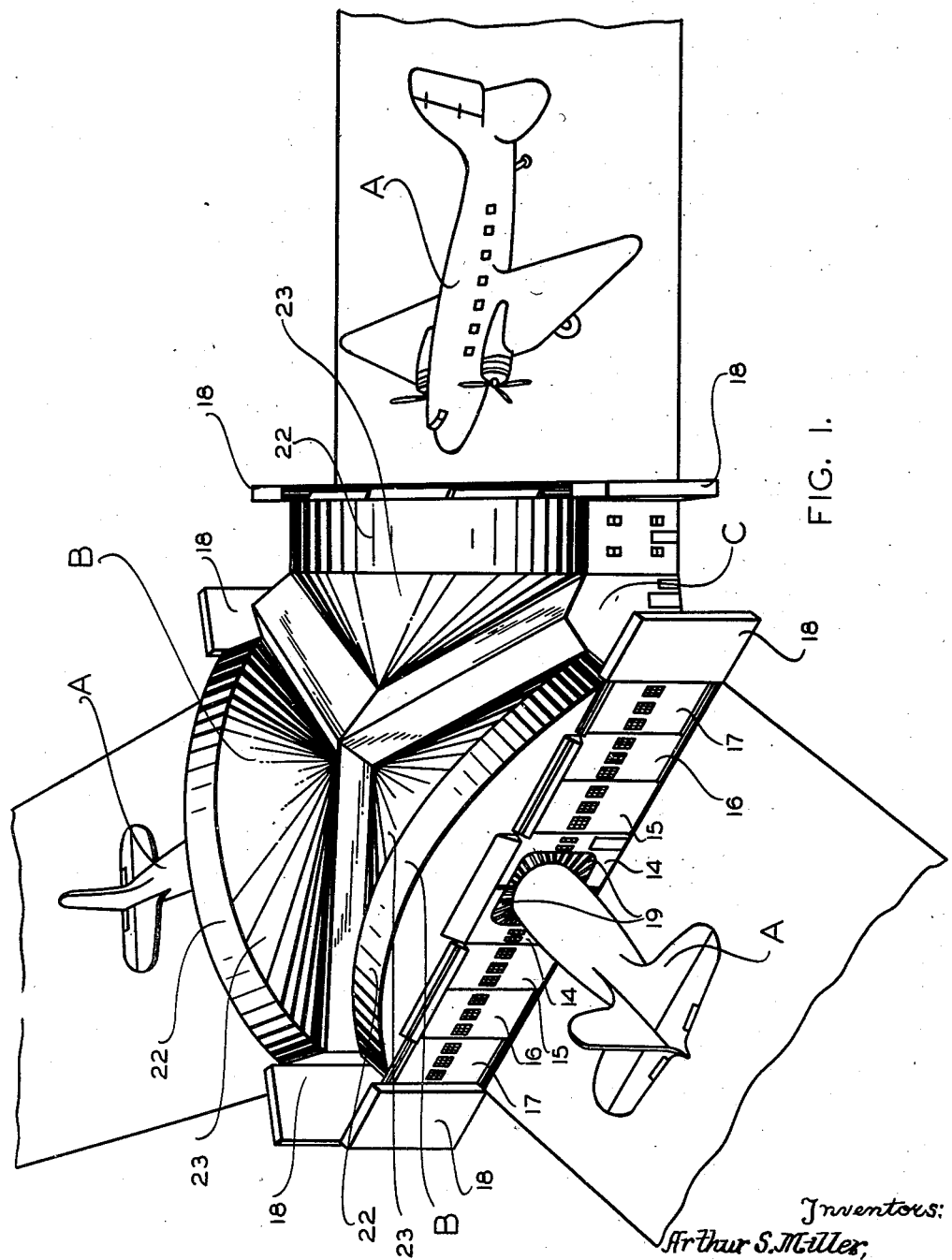
Figure 1 is a perspective view of our airplane hangar, administrative and shop units showing the manner in which the same would be used to receive and house the nose, engines and wings of an airplane.

We have designed our airplane hangar units triangular in form so as to receive the long forwardly projecting nose, engines and wings of the airplane A with the empennage projecting out of the airplane hangar unit B as illustrated in Figure 1. This provides a peculiar form of airplane hangar unit which may be clustered together with several other similar units with a common axis for all of the units and provides a construction of airplane hangar units which can be made economically and which may also be maintained on an economical scale where it is desirable to heat the airplane hangar unit during the colder seasons of the year.

It is apparent that the engines in large airplanes are normally mounted in the edge of the wings and it is this front edge portion, including the wings, which usually requires service in maintaining the airplane. Therefore, it is desirable to house this portion of the airplane and with this in mind, we have designed our building units to take care of this need. Furthermore, it is also desired to take up as small a space as possible in the airplane hangar units, and in view of the present development of large transport airplanes, it will be apparent that with our form and design of building, these airplanes can be really serviced in an economical manner while they are housed within the airplane hangar unit. Should it become necessary to service the empennage of the airplane, this can be taken care of by backing the airplane into the hangar or by the alternative form of building unit which we have designed to enclose the entire airplane.

It is of primary importance in our design of airplane hangars, as well as the shop buildings for providing service means for the airplanes, to arrange the different hangars grouped in a manner so as to not interfere with each other so that individual planes may be moved in and out of the respective hangars without interfering with other planes in other similar hangars. Furthermore, by our design of airplane hangar, we are able to provide one or more airplane hangar units as the respective airfields may require. We have found it desirable that if the airfield starts out with one hangar for one large transport airplane, and it is found desirable to add more hangar units, this may be easily accomplished owing to the fact that each hangar unit is a separate section which may be added to the first section whenever it is desired.

Figure 2:
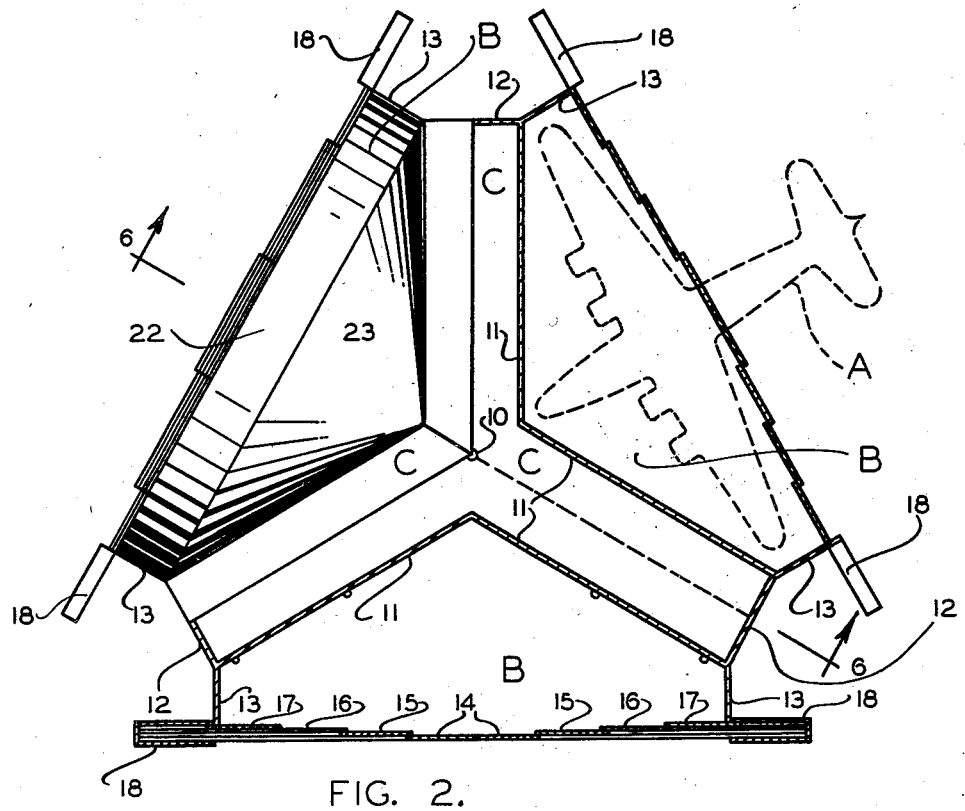
Figure 2 is a plan view partly in section of the building illustrated in Figure 1.

We have also found that it is desirable to separate the airplane hangars B by rectangular shop or administrative buildings C. Thus, when a common axis such as the point 10 is used for a cluster of airplane hangars B, as illustrated in Figures 1 and 2, the buildings C which are primarily rectangular in shape separate the individual hangars B and extend radially from the common axis point 10. Thus, the buildings C (where a group of three are used) extend in a form of a Y and are all connected together to form a covered passageway between the respective airplane hangar units B, as well as communicating with all the respective units through doors or openings (not shown in the drawings) into the respective airplane hangar units B.

It will also be apparent with our design of airplane hangar units, the walls 11 are common to the buildings B and C. In this manner we economize in the building of our airplane hangar units B and the shop and administrative buildings C. End walls 12 are provided for the buildings C, while parallel side walls 13 are provided for the airplane hangar units B. The walls 13 are adapted to be spaced apart sufficiently to admit the wings of the largest airplanes A that will be using the airport where our triple rows of airplane hangar units are used.

Figure 3:
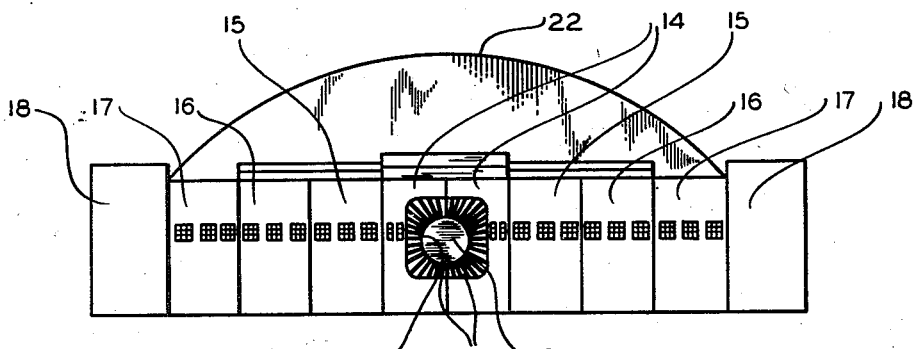
Figure 3 is a front view looking toward the slidable, overlapping doors which close the entrance into the airplane hangar.

The long wall of the triangular shaped airplane hangar unit is adapted to be opened or closed by the series of sliding overlapping pairs of doors 14, 15, 16 and 17. The pair of doors 14 represent the central doors as illustrated in Figure 3, while the next adjacent pair of doors are 15, and the pairs of doors 16 are adjacent the doors 15, while the outer doors 17 are adjacent the pair of doors 16. All these doors overlap with each other and are adapted to slide on suitable tracks and rollers (not illustrated) so that these doors may be moved into open position and are housed within the end pockets 18 which project beyond the outside of the walls 13. The center pair of doors is provided with a central soft flexible portion 19 to provide the hole 20 centrally therein. This soft flexible curtain portion 19 fits around the fuselage forwardly of the empennage and just back of the wings of the airplane A. This curtain portion 19 should fit snugly enough to prevent the loss of heat out of the building B and thus we provide an economical airplane hangar unit B, owing to its comparably small nature as compared to the size of the respective airplanes which are adapted to be housed within the hangar units B. When the airplane is out of the hangar unit B, the opening 20 is closed by the curtain 21.

The roofs 22 of the airplane hangar units B may be made arcuated as illustrated in Figures 1, 2 and 3 so that in constructing the same, the frame work may be formed accordingly to provide a large arched space above the wings and engines of the plane to provide the necessary working space within the building units B. The forward portion 23 of the roof of the airplane hangar units B may be sloped toward the common axis 10 and project from the portion 22 to join with the walls 11.

The buildings C may be formed with a hip roof 24 extending from the top of the walls 11 and braced by the cross members 25 to provide an attic storage space 26 above the cross members 25 if desired. The building C may be divided by a second floor 27 so that an administrative office may be provided on the second floor 27 while the work shop may be arranged on the first floor 28 or vice versa as may be desired. It will be apparent that by using the common wall 11 for the airplane hangar unit buildings B and the buildings C that we provide an economical construction in the design of our building units or sections B and C for housing and servicing airplanes A.

It will also be apparent that the buildings C provide passageways between the respective airplane hangar unit buildings B so that passengers may be admitted through the same to the respective airplanes in the respective hangars B and cargoes may be carried through these buildings from and to the airplanes, so that loading and unloading of the airplanes may be carried on under cover and protection of the building units B and C. In this manner we provide a unique means of protecting the airplanes as well as the passengers and cargo in a very economical manner.

Figure 4:
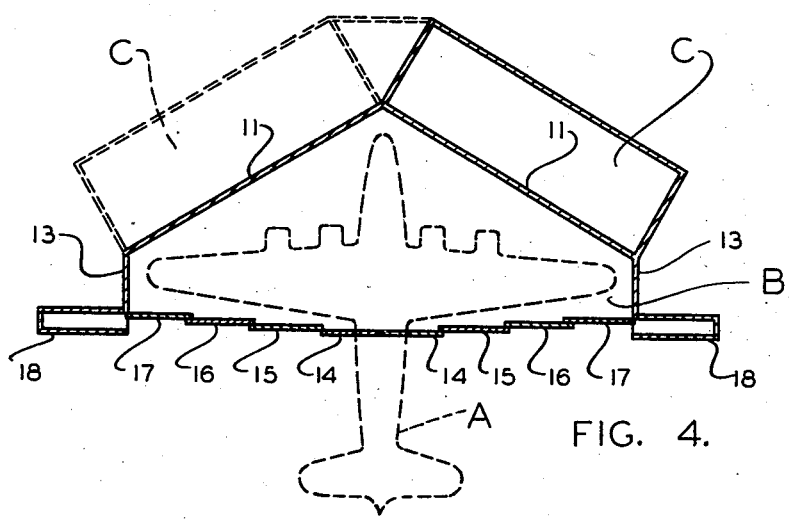
Figure 4 is a sectional detail showing our airplane hangar in one unit with one shop or administrative building unit associated with the airplane hangar unit and with a second shop or administrative building dotted in to show its relative position.
Figure 6:
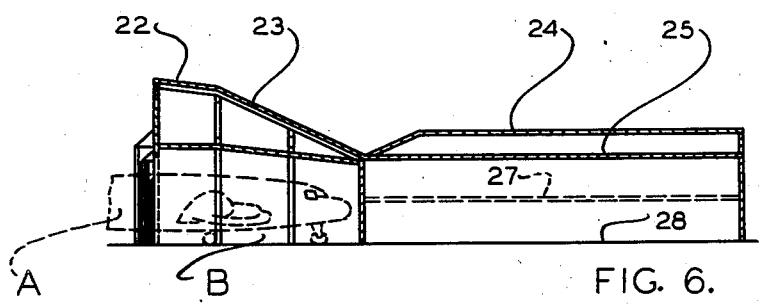
Figure 6 is a section on the line 6—6 of Figure 2.
Figure 5:
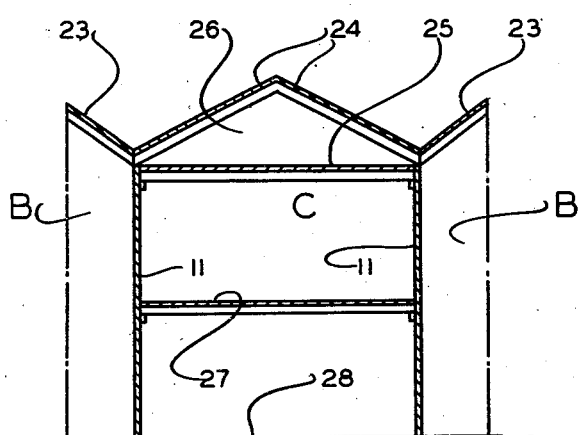
Figure 5 is a detail section in elevation of the shop and/or administrative building and a portion of the associated hangar units.
Figure 7:
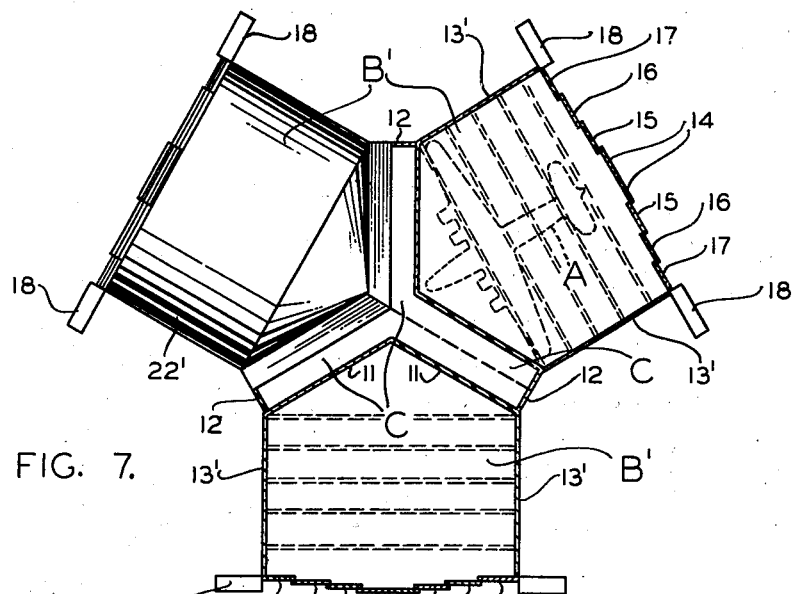
Figure 7 is a plan view partly in section showing three hangars clustered together in a group and showing the alternative form where the hangar projects to include the empennage.

While we believe that the most economical construction of our airplane hangar unit B, as illustrated, with one unit shown in the plan view in Figure 4, and with the added similar units B shown in Figures 1 and 2, where the airplane unit hangar B is made substantially triangular and in which construction the nose, engines and wings of the airplane are adapted to be housed, as also illustrated in Figures 1, 2 and 4, within the hangar B, yet we recognize that an alternative form of our airplane unit such as B', illustrated in Figure 7, may be readily and economically constructed by simply extending the parallel walls 13 to the length 13', illustrated in Figure 7, so as to house an entire airplane if it is desired. This construction of our airplane hangar B' is substantially the same as heretofore described in providing the triangular portion for receiving the nose, engines and wing spread of the airplane A. Naturally, the building construction B' or the hangar is more costly than that illustrated in hangar B. Furthermore, the airplane space in the hangar B' will require a greater amount of heat to condition the same for colder weather. Nevertheless, a small amount of heat may be maintained in either the hangar B or the hangar B' while the buildings C may be heated to the desired degree for work shop facility and for administrative buildings as they are desired for use.

Figure 8:
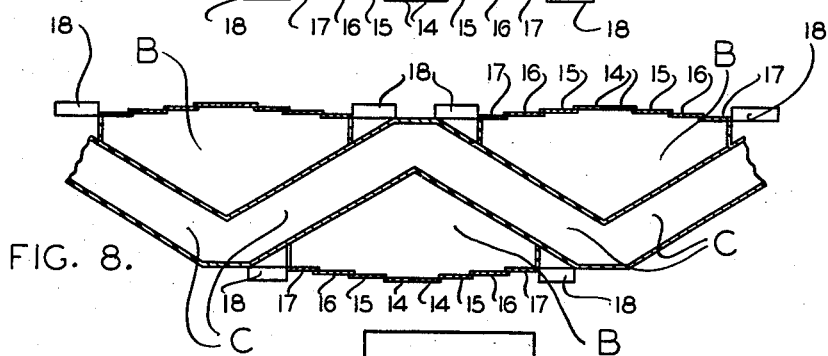
Figure 8 is a diagrammatic plan view in section showing an alternative arrangement of the building units.

We also have illustrated an alternative arrangement of our airplane hangars B in the diagrammatic plan view Figure 8 where we have shown the building units C extended in a zigzag formation with the hangar B on the opposite sides of the buildings C.

Figure 9:
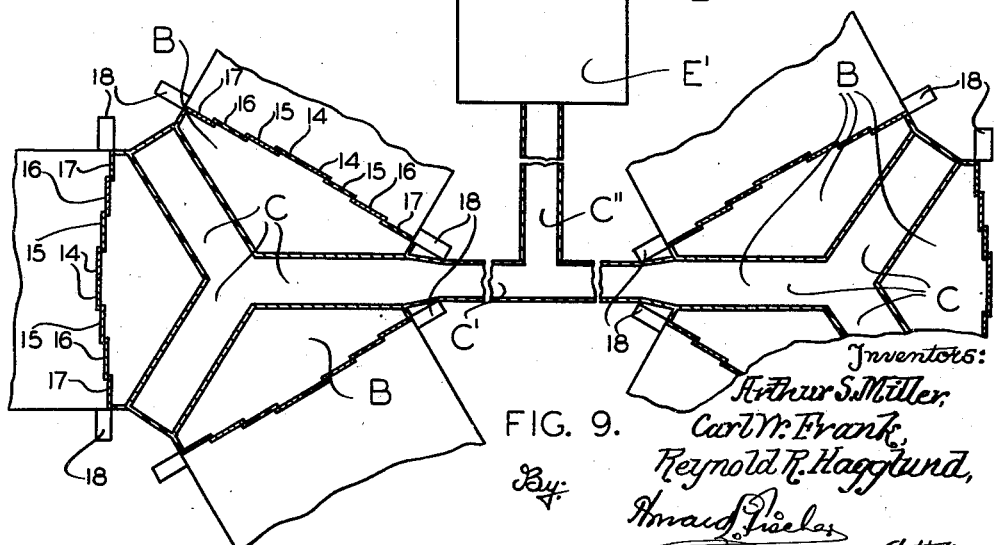
Figure 9 is a diagrammatic sectional plan view showing a further alternative arrangement of the respective building units.

In some airports it may be desirable to arrange our airplane hangars B in groups of three as illustrated diagrammatically in Figure 9 with the building units C spaced between the hangar B and with connecting enclosed passageways C' and C'' which connect with the main administrative or office building space which is spaced some distance away from the hangars B. It will be obvious that the connecting passageways C' and C'' may be sufficiently long to properly space the groups of airplane hangars B apart on the airfield.

It is also a feature of our airplane hangar design and construction to provide the hangars B and B' in sections and of a portable nature so that they can be set up on any airfield and can be constructed hurriedly where it is desired or moved from place to place as the occasion may require. This is also true of the buildings C and the passageways C' and C'' as well as the administrative building space.

We believe that the design and arrangement of our airplane hangars B and B' are unique in providing an economical building construction in conjunction with the building C and that each hangar B is a unit by itself to which may be added the building units C as they may be desired, as well as several units B in groups or individually as the airfield requires to provide the necessary service for airplanes using the respective airfields. We also have found that arrangement of these units is very desirable, not only in handling and servicing the airplanes, but in loading and unloading them with passengers and cargo.

We have endeavored to illustrate the best embodiment of our respective building units, namely, the airplane hangar, the shop and administrative buildings, as well as the passageways connecting the same. However, these illustrations and description thereof are merely suggestive of a manner in which our invention may be carried out and we desire to have the same interpreted within the scope of the following claim.

We claim:

An airplane hangar, including administrative and shop units, comprising a central Y-shaped building unit made up of a series of individual rectangular building units connected together at a common axis by a triangular portion, a series of hangar units, two walls of each of said hangar units being common with the walls of said Y-shaped unit, each of said hangar units comprising triangular and rectangular portions opening into each other to provide the hangar unit for receiving the wings, nose and the engines of an airplane, a series of overlapping doors for closing said hangar units, and a flexible central portion which is adapted to fit around the empennage just back of the wings, and means for receiving said doors beyond the sides of said hangar units when the doors are in open position.

ARTHUR S. MILLER.
CARL W. FRANK.
REYNOLD R. HAGGLUND.

REFERENCES CITED

The following references are of record in the file of this patent:

UNITED STATES PATENTS

| Number | Name | Date |
| --- | --- | --- |
| 1,780,102 | Watt | Oct. 28, 1930 |
| 1,903,847 | Wood | Apr. 18, 1933 |

FOREIGN PATENTS

| Number | Country | Date |
| --- | --- | --- |
| 481,387 | British | Mar. 10, 1938 |
| 3,387 | British | May 18, 1911 |
| 679,706 | French | 1930 |